(12) United States Patent
Lenk et al.

(10) Patent No.: US 12,259,061 B2
(45) Date of Patent: Mar. 25, 2025

(54) BLOW-OFF VALVE

(71) Applicant: PIERBURG GMBH, Neuss (DE)

(72) Inventors: Martin Lenk, Neuss (DE); Michael Thiery, Kaarst (DE); Tanner Cavdar, Korschenbroich (DE)

(73) Assignee: PIERBURG GMBH, Neuss (DE)

( * ) Notice: Subject to any disclaimer, the term of this patent is extended or adjusted under 35 U.S.C. 154(b) by 23 days.

(21) Appl. No.: 17/920,031

(22) PCT Filed: Apr. 24, 2020

(86) PCT No.: PCT/EP2020/061531
§ 371 (c)(1),
(2) Date: Oct. 20, 2022

(87) PCT Pub. No.: WO2021/213681
PCT Pub. Date: Oct. 28, 2021

(65) Prior Publication Data
US 2023/0204129 A1 Jun. 29, 2023

(51) Int. Cl.
*F16K 39/02* (2006.01)
*F02B 37/18* (2006.01)
(Continued)

(52) U.S. Cl.
CPC .......... *F16K 39/022* (2013.01); *F02B 37/183* (2013.01); *F16K 1/36* (2013.01); *F16K 31/0655* (2013.01); *F16K 27/029* (2013.01)

(58) Field of Classification Search
CPC ............ F16K 31/0693; F16K 31/0689; F16K 39/022; F16K 31/0655; F16K 1/34;
(Continued)

(56) References Cited

U.S. PATENT DOCUMENTS 2,179,165 A * 11/1939 Sifkovitz ................ F16K 41/14
137/902
5,897,096 A * 4/1999 Nakano ................. F16K 41/103
251/65

(Continued)

FOREIGN PATENT DOCUMENTS

| CN | 101487536 A | 7/2009 |
|---|---|---|
| CN | 204611049 U | 9/2015 |

(Continued)

*Primary Examiner* — Craig J Price
(74) *Attorney, Agent, or Firm* — Norman B. Thot

(57) ABSTRACT

An overrun-air recirculation valve includes a flow housing having a flow channel, a valve seat, an actuator, an actuating member movable via the actuator, and a control body fastened to the actuating member. The control body has a lateral outer surface having a bearing edge which is placeable onto and liftable off of the valve seat, a flow-on surface arranged on an axial side facing away from the actuating member, and a wall extending radially inwardly from the lateral outer surface. The flow-on surface has a flow-off edge offset axially to the bearing edge so that a first vector extending radially outwardly from the flow-off edge to a nearest point of the bearing edge to a plane spanned by the bearing edge encloses an angle of <15°, and the wall is offset axially to the bearing edge and to the flow-off edge in a direction of the actuating member.

15 Claims, 2 Drawing Sheets

(51) Int. Cl.
*F16K 1/36* (2006.01)
*F16K 31/06* (2006.01)
*F16K 27/02* (2006.01)

(58) Field of Classification Search
CPC .......... F16K 1/36; F16K 1/46; F16K 139/024;
F16K 31/0686; F16K 39/024; F16K
27/029; F01D 17/145; F02B 37/16; F02B
29/0418; F02B 39/00; F02B 37/183;
F02B 37/162; F02B 37/18; F02B
29/0406; F05D 2220/40; F05D 2240/55;
F02M 26/26; F02M 26/06; F02M
35/10281; F02M 35/10209; F02M
35/10386; F02M 26/10; F02M 26/23;
Y02T 10/12; Y02T 10/40; F01M 13/00;
F02D 9/08
USPC ............ 251/335.1, 282, 67, 129.15, 129.16,
251/129.19, 50, 30.04, 38;
123/559.1–566; 60/611, 605.1; 137/490
See application file for complete search history.

(56) References Cited

U.S. PATENT DOCUMENTS

| | | | | |
|---|---|---|---|---|
| 6,095,490 | A * | 8/2000 | Nakano | F16K 31/0655 251/86 |
| 7,757,873 | B2 * | 7/2010 | Thiery | F02M 26/26 215/282 |
| 8,191,855 | B2 * | 6/2012 | Hezel | F16K 31/0655 251/38 |
| 8,387,383 | B2 * | 3/2013 | Thiery | F02B 37/16 251/282 |
| 8,484,970 | B2 * | 7/2013 | Bielass | F02B 37/16 60/602 |
| 8,544,816 | B2 * | 10/2013 | Bielass | F16K 39/022 251/50 |
| 8,678,343 | B2 * | 3/2014 | Czimmek | F02M 23/00 335/255 |
| 8,752,585 | B2 * | 6/2014 | Buse | G05D 16/2097 137/625.68 |
| 8,839,767 | B2 * | 9/2014 | Keller | F16K 24/04 251/282 |
| 9,157,545 | B2 * | 10/2015 | Czimmek | F02B 39/00 |
| 9,261,015 | B2 * | 2/2016 | Zurke | F04D 27/001 |
| 9,945,328 | B2 * | 4/2018 | Yoshioka | F02M 26/06 |
| 9,970,565 | B2 * | 5/2018 | Bonanno | F02B 33/00 |
| 10,041,396 | B2 * | 8/2018 | Lenk | F16K 1/46 |
| 10,041,401 | B2 * | 8/2018 | Lenk | F02M 35/10157 |
| 10,077,709 | B2 * | 9/2018 | Turner | F16K 31/40 |
| 10,125,891 | B2 * | 11/2018 | Bonanno | F16K 1/482 |
| 10,253,682 | B2 * | 4/2019 | Lenk | F16K 27/029 |
| 10,260,644 | B2 * | 4/2019 | Bonanno | F16K 1/485 |
| 10,393,273 | B2 * | 8/2019 | Schmitz | F02B 37/16 |
| 10,443,739 | B2 * | 10/2019 | Cao | F16K 31/0655 |
| 10,550,953 | B2 * | 2/2020 | Ito | F16K 31/0655 |
| 10,724,653 | B2 * | 7/2020 | Kajio | H01M 8/04089 |
| 11,060,619 | B2 * | 7/2021 | Bonanno | F16K 31/0686 |
| 11,168,802 | B2 * | 11/2021 | Bonanno | F16K 25/005 |
| 11,168,803 | B2 * | 11/2021 | Bonanno | F16K 31/0686 |
| 11,168,806 | B2 * | 11/2021 | Bonanno | F16K 25/005 |
| 11,168,807 | B2 * | 11/2021 | Bonanno | F16K 39/024 |
| 11,181,204 | B2 * | 11/2021 | Bonanno | F16K 31/0686 |
| 11,242,796 | B2 * | 2/2022 | Bonanno | F16K 31/0655 |
| 11,384,859 | B2 * | 7/2022 | Bonanno | F02B 37/16 |
| 11,649,897 | B1 * | 5/2023 | Richardson | F16K 1/04 251/367 |
| 11,714,019 | B2 * | 8/2023 | Lucka | F16K 31/0655 60/605.1 |
| 11,795,864 | B2 * | 10/2023 | Sadiku | F16K 39/022 |
| 2007/0051105 | A1 | 3/2007 | Thiery et al. | |
| 2008/0276896 | A1 * | 11/2008 | Koster | F02B 37/16 123/188.4 |
| 2009/0183510 | A1 * | 7/2009 | Bielass | F16K 31/0689 251/335.1 |
| 2009/0301081 | A1 * | 12/2009 | Thiery | F16K 39/022 60/602 |
| 2010/0206388 | A1 | 8/2010 | Bielab | |
| 2013/0313455 | A1 * | 11/2013 | Bittner | F16K 31/0658 251/129.15 |
| 2014/0084197 | A1 * | 3/2014 | Voss | B60T 15/028 251/129.15 |
| 2017/0145910 | A1 * | 5/2017 | Egami | F16K 1/465 |
| 2017/0292615 | A1 * | 10/2017 | Schmitz | F02B 37/16 |
| 2019/0383413 | A1 * | 12/2019 | Bonanno | F16K 31/0686 |
| 2020/0096129 | A1 * | 3/2020 | Bonanno | F16K 39/024 |
| 2020/0347955 | A1 * | 11/2020 | Bonanno | F16K 39/022 |
| 2021/0080021 | A1 * | 3/2021 | Bonanno | F02B 37/16 |
| 2021/0172534 | A1 * | 6/2021 | Grüneis | F16K 31/0655 |
| 2021/0199045 | A1 * | 7/2021 | Bhandari | F16K 31/0655 |
| 2021/0215266 | A1 * | 7/2021 | Bonanno | F16K 1/46 |
| 2021/0239232 | A1 * | 8/2021 | Bhandari | F16K 1/42 |
| 2021/0317778 | A1 * | 10/2021 | Grüneis | F16K 31/0655 |

FOREIGN PATENT DOCUMENTS

| | | | | |
|---|---|---|---|---|
| DE | 102008005088 B3 * | 7/2009 | ......... F01D 17/145 |
| DE | 10 2016 118 341 A1 | 3/2018 | |
| DE | 10 2017 222 628 A1 | 6/2019 | |
| EP | 1762712 A2 * | 3/2007 | ......... F02B 29/0418 |
| EP | 1 762 712 B1 | 4/2013 | |
| WO | WO 2017/216957 A1 | 12/2017 | |
| WO | WO 2019/121305 A1 | 6/2019 | |
| WO | WO 2019/121532 A1 | 6/2019 | |

* cited by examiner

BLOW-OFF VALVE

CROSS REFERENCE TO PRIOR APPLICATIONS

This application is a U.S. National Phase application under 35 U.S.C. § 371 of International Application No. PCT/EP2020/061531, filed on Apr. 24, 2020. The International Application was published in German on Oct. 28, 2021 as WO 2021/213681 A1 under PCT Article 21(2).

FIELD

The present invention relates to an blow-off valve, which is here referred to as an overrun-air recirculation valve, having a flow housing with a flow channel between an inlet and an outlet, a valve seat formed between the inlet and the outlet, an actuator, an actuating member which can be moved in translation by the actuator, a regulating body which is fastened to the actuating member and which comprises a radially outer circumferentially closed lateral surface, at the axial end of which a circumferential bearing edge is formed, which can be placed on the valve seat and lifted off from the valve seat, wherein the control body comprises a radially inner axial flow-on surface on the axial side facing away from the actuating member, and comprises a wall which extends at least radially inwards from the circumferentially closed lateral surface and in which at least one opening is formed, via which an inner space of the overrun-air recirculation valve is fluidically connected to the flow channel.

BACKGROUND

Overrun-air recirculation valves are used in a known manner for recirculating compressed fresh gas, possibly with recirculated exhaust gas, from the pressure side of a compressor of a turbocharger back to the suction side of the compressor. The connection between the discharge side and the suction side of the compressor via a bypass line is required for the transition from high load to overrun operation of the internal combustion engine in order to prevent high delivery of the compressor of the turbocharger against a closed throttle valve and the resulting pumping effect.

Overrun-air recirculation valves are often electromagnetically actuated, wherein the control body of the valve is moved via the armature by the electromagnetic force. A generic overrun-air recirculation valve is described, for example, in DE 10 2016 118 341 A1. The therein described valve comprises a pressure compensation opening on the control body which is connected to the armature, whereby, with appropriate design of the effective surfaces, a force equilibrium is established with respect to the pneumatic forces acting on the control body so that only the force of a spring must be overcome for actuation, as a result of which the overrun-air recirculation valve has very short actuation times. The closing body in this valve is directly connected to the armature, and the inside of the valve is separated from the outside by a diaphragm. The problem nonetheless arises that at very short strokes from the closed position, the static pressure falls very quickly due to the dynamic pressure created, which causes a large force to act on the control body in the closing direction.

In previous generations of overrun-air recirculation valves, such as those described in EP 1 762 712 B1, attempts have also been made to transfer this low static pressure generated during opening to the opposite side of the control body by bringing the openings directly up to the narrow opening area. However, this results in relatively large spring forces having to be provided for closing and thus also relatively large forces for initiating the opening movement by the electromagnet, which must be designed to be correspondingly large.

SUMMARY

An aspect of the present invention is to provide an overrun-air recirculation valve with which very fast actuating times can be realized and where low electromagnetic actuating forces are required, whereby the installation space of the overrun-air recirculation valve and, in particular, the space for the electromagnet can be reduced and thus the overrun-air recirculation valve can be manufactured more economically.

In an embodiment, the present invention provides an overrun-air recirculation valve which includes a flow housing comprising a flow channel between an inlet and an outlet, a valve seat formed between the inlet and the outlet, an actuator, an actuating member which is configured to be translationally movable via the actuator, and a control body which is fastened to the actuating member. The control body comprises a radially outer circumferentially closed lateral outer surface which comprises, at an axial end, a circumferential bearing edge which is configured to be placed onto the valve seat and to be lifted off of the valve seat, a radially inner axial flow-on surface which is arranged on an axial side facing away from the actuating member, and a wall which extends at least radially inwardly from the radially outer circumferentially closed lateral outer surface and in which at least one opening is formed via which an interior of the overrun-air recirculation valve is fluidically connected to the flow channel. The radially inner axial flow-on surface comprises a radially outer annular flow-off edge which is offset in an axial direction relative to the circumferential bearing edge by a maximum amount so that a first vector which extends radially outwardly from the radially outer annular flow-off edge to a nearest point of the circumferential bearing edge to a plane which is spanned by the circumferential bearing edge encloses an angle of at most 15°, and the wall with the at least one opening is offset axially with respect to the circumferential bearing edge and with respect to the radially outer annular flow-off edge in a direction of the actuating member.

BRIEF DESCRIPTION OF THE DRAWINGS

The present invention is described in greater detail below on the basis of embodiments and of the drawing in which.

DETAILED DESCRIPTION

Figure 1:
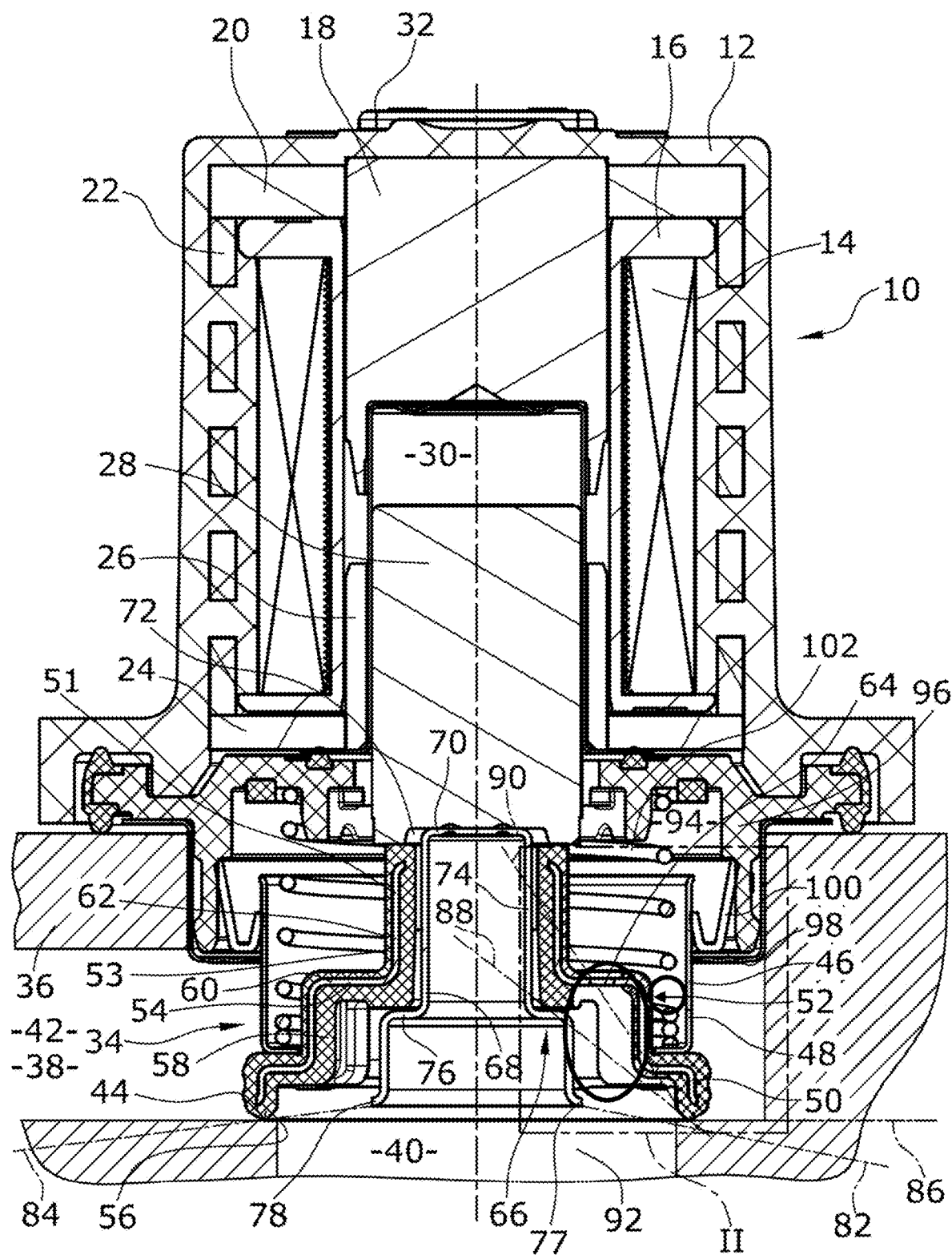
FIG. 1 shows a side view of an overrun-air recirculation valve according to the present invention in a sectional view.
Figure 2:
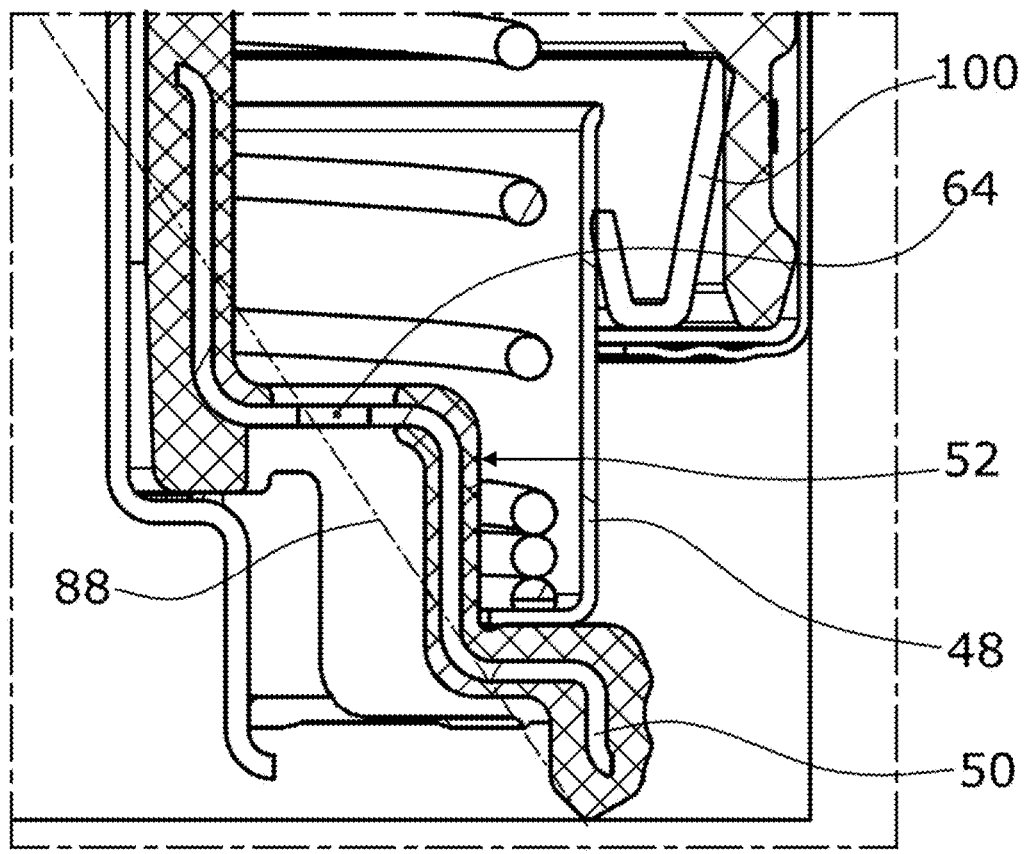
FIG. 2 shows an enlarged view of a section of FIG. 1.

The control body of the overrun-air recirculation valve according to the present invention comprises a radially outer, circumferentially closed lateral surface, at the axial end of which a circumferential bearing edge is formed which can be placed on the valve seat and lifted off from the valve seat, wherein the term bearing edge is here to be understood as a narrow annular surface which tapers narrowly towards the valve seat. The control body also comprises a radially inner axial flow-on surface on the axial side facing away from the actuator which is connected at least indirectly to the outer surface via an at least radially extending wall. At least one opening is formed in this wall, via which an interior of the overrun-air recirculation valve is fluidically connected to the flow channel so that the same pressure is present below and above the control element, at least as long as the control element is not moved. A radially outer flow-off edge of the axial flow-on surface is offset in the axial direction relative to the bearing edge by at most an amount that a first vector from the radially outer flow-off edge to the nearest point of the bearing edge to a plane spanned by the bearing edge encloses at most an angle of 15°. This means that there is only a slight axial offset between the flow-off edge of the on-flow surface and the bearing edge of the control body. The air flow is therefore directed approximately in the direction of the free gap between the valve seat and the bearing edge of the control body when the valve is first opened. The at least radially extending wall with the at least one opening is furthermore axially offset from the bearing edge and from the flow-off edge in the direction of the actuating member. Due to the axial distance of the wall from the bearing edge, the pressure difference acting in the closing direction during opening, which is created by the flow, only acts on the thin bearing edge, so that only a very small closing force acts on the control body. By directing the current into the gap and the small available contact surface for the resulting pressure, a uniform force curve is produced during opening with low necessary opening forces. The electromagnet can thus be made smaller while still realizing fast opening and closing times.

In an embodiment of the present invention, a tangent vector can, for example, point to a point on the radially outer flow-off edge in an area facing away from the actuating element which is axially directly adjacent to the bearing edge. It follows that the flow is directed directly into the gap between the valve seat and the bearing edge when the opening process begins. This significantly reduces the force acting on the control body in the closing direction due to the air flow.

It is furthermore advantageous if the at least radially extending wall is offset so far in the direction of the actuating member that a second vector in the radial direction outwards from the at least radially extending wall to the bearing edge encloses an angle of at least 20° to a plane spanned by the bearing edge. This has the effect that the wall is set back far enough so that the decreasing pressure in the gap cannot act directly on the wall surface, thus reducing the force acting on the control body in the closing direction. Radial outward in this context is simply to be understood to mean that the vector comprises a radial component pointing away from the centerline of the overrun-air recirculation valve. There will, however, of course also be an extension component of the vector in the axial direction. This applies to all vectors mentioned herein, which by definition point radially outward.

In an embodiment of the present invention, the opening can, for example, be offset so far in the direction of the actuating member that a third vector in the radially outward direction from the opening to the bearing edge to a plane spanned by the bearing edge includes at least an angle of 30° and that a fourth vector in the radially outward direction from the flow-off edge to the opening to a plane spanned by the bearing edge includes at least an angle of 30°. The equilibrium of forces is thereby maintained even in the event of sudden changes in position and thus changes in pressure at the surface facing the inlet at the two axial ends of the openings, whereby short positioning times are achieved and low positioning forces are required.

In an embodiment of the present invention, the circumferentially closed lateral surface can, for example, be formed by a cylindrical body and a radially outer and axially to the valve seat facing area of an inner hollow body on which the cylindrical body is fixed, wherein the inner hollow body is motion-coupled to the actuator and comprises the wall with the at least one opening and the bearing edge. This embodiment facilitates assembly of the control body.

In an embodiment of the present invention, the axial flow-on surface can, for example, be formed on a flow-on element having a closed bottom facing the actuating member and an open axial end facing away from the actuating member, the radially outer flow-off edge being formed on the flow-on element. The on-flow surface is thus formed by an approximately pot-shaped body which is easy to manufacture and which can be used to facilitate attachment of the control body to the actuating member by welding the bottom centrally to the actuating member.

In an embodiment of the present invention, the radially outer flow-off edge can, for example, be formed on a collar which extends radially outwardly and optionally axially from the open axial end of the flow-on element. A correspondingly aligned flow-off edge can thereby be provided without additional components.

It is in this case, for example, possible for the collar to comprise a greater axial distance from the actuating member than the bearing edge and to extend in the radially outer region exclusively radially outward. The flow would in this case be directed radially outward and thus into the gap between the valve seat and the bearing edge during the initial opening process.

In an embodiment of the present invention, the collar can, for example, comprise a smaller axial distance from the actuating member than the bearing edge and extends radially outward in the radially outer region and axially in a direction away from the actuating member. The flow-off edge in this case also points into the gap between the control member and the valve seat immediately after the initiation of the opening process. In both alternative embodiments, the closing force acting on the control body is reduced shortly after the initiation of the opening process compared to known embodiments.

In an embodiment of the present invention, the inner hollow body can, for example, comprise an insert which is at least partially coated with an elastomeric plastic, wherein the inner hollow body is lowerable with the plastic onto the valve seat and is in contact against the actuating member. This plastic coating on the bearing edge provides a tight valve seat since minor unevenness can be compensated for by the elasticity. The plastic coating in the area of contact with the actuating member provides that the control body can be tilted slightly towards the actuating member, which also leads to improved tightness.

The flow-on element is attached with the bottom to the actuating element for this purpose. The bottom can be attached to the actuating member by simple laser welding.

To secure the entire control body, the flow-on element comprises a radial extension with which the flow-on element is in contact against a radial constriction of the inner hollow body, at least in the open state. The inner hollow body can be tilted slightly in relation to the flow-on element, which is attached to the actuating element, and thus to the outer lateral surface and the contact edge.

Particularly favorable manufacturing results if the cylindrical body, the inner hollow body, and the flow-on element are manufactured as deep-drawn parts from sheet metal.

In an embodiment of the present invention, the actuator can, for example, be an electromagnet and the actuating element can, for example, be the armature of the electromagnet. This provides for short actuating times.

An overrun-air recirculation valve is thus created which comprises high durability and tightness. Above all, however, the size of the solenoid and thus the manufacturing costs can be significantly reduced, since the forces to be overcome during the opening process are reduced by the special flow away from the flow-on element in that the direction of the flow is optimally adjusted and the available force-acting surfaces for a pressure difference are reduced.

An embodiment of an overrun-air recirculation valve according to the present invention is shown in the drawing and is described below.

The overrun-air recirculation valve shown in the drawing comprises an actuator 10 designed as an electromagnet, in the housing 12 of which a coil 14 is wound on a coil carrier 16. A magnetizable core 18 is fixed in the radially inner region of the coil carrier 16, the axial end of which projects beyond the coil carrier 16, wherein the core 18 is surrounded at this axial end by a magnetic force return plate 20 which is in connection with an iron jacket 22 surrounding the coil 14. At the end of the coil carrier 16 opposite to the core 18 is a further magnetic force return plate 24, which is in contact in the radially outer region with the iron jacket 22, and in the radially inner region with a sliding bushing 26, which extends into the coil carrier 16. An armature acting as an actuating member 28 is mounted in the sliding bushing 26. This armature is drawn to the core 18 and into its central recess 30 by the electromagnetic force when the coil 14 is energized. Power is supplied to the coil 14 via contacts which end in a plug 32.

A control body 34 is attached to the actuating member 28, via which control body 34 a flow cross-section of a flow channel 38 formed in a flow housing 36 and connecting an inlet 40 to an outlet 42 can be opened or closed off by lowering the control body 34 onto or lifting the control body 34 off a valve seat 44 surrounding the flow cross-section.

The control body 34 consists of a radially outer circumferentially closed lateral outer surface 46, which is formed by a radially outer cylindrical body 48, which is made, for example, of sheet metal by deep drawing, and a radially outer, as well as axially to the valve seat 44 facing, radially outer region 50 of an inner hollow body 52.

The inner hollow body 52 comprises an insert 51 which can be produced from sheet metal by deep drawing and comprises a wall 54 which has at least one inward radial extension component or extends radially inwardly at least in sections. To form the inner hollow body 52, the insert 51 is overmolded with an elastomeric plastic 53, which forms a bearing edge 56 in the radially outer region 50 facing axially toward the valve seat 44, with which the control body 34 rests on the valve seat 44 in the closed state of the overrun-air recirculation valve. The effective diameter for resting on the valve seat 44 corresponds essentially to the diameter of the radially outer circumferentially closed lateral outer surface 46, whereby a force equilibrium of the acting pneumatic forces on the control body 34 is established in the static state.

The wall 54 of the inner hollow body 52 is cylindrical in a first cylindrical section 58. Adjacent to this first cylindrical section 58 is a radial constriction 60, from the inner diameter of which a further second cylindrical section 62 extends in the direction of the actuating member 28, which correspondingly comprises a smaller diameter than the first cylindrical section 58. At its axial end, the second cylindrical section 62 is bent slightly inwards. Several axial bores are formed in the area of the radial constriction 60 which, as openings 64, allow for a pressure equalization between the underside and the upper side of the control member 34.

With the exception of the openings 64, the cylindrical sections 58, 62 as well as the radial constriction 60 are overmolded with the elastomeric plastic 53, which projects axially in the direction of the actuating member 28 above the second cylindrical section 62.

The control body 34 further comprises a radially inner axial flow-on surface 66, which in the present embodiment is formed on a flow-on element 68 that serves to secure the control body 34 to the actuating member 28. The flow-on element 68 may also be formed by deep drawing and is substantially pot-shaped, wherein a bottom 70 is disposed in a central circular recess 72 at the axial end of the actuating member 28 and is secured at that location by welding. A cylindrical section 74 adjoining the bottom 70 extends to the end of the elastomeric plastic 53 on the inner hollow body 52 facing away from the actuating member 28, and comprises an outer diameter which is smaller than the inner diameter of the elastomeric plastic 53. Adjoining this cylindrical section 74 on the axial side opposite the bottom 70 is a radial extension 76 in annular form which projects radially beyond the elastomeric plastic 53, and the outer diameter of which is thus larger than the inner diameter of the radial constriction 60 of the inner hollow body 52. The distance of the radial extension 76 from the bottom 70 of the flow-on element 68 is selected so that a small gap remains between the elastomeric plastic 53 surrounding the radial constriction 60 of the inner hollow body 52, when the inner hollow body 52 is in contact with the actuating member 28, and the radial extension 76 of the flow-on element 68, so that the radially outer circumferentially closed lateral outer surface 46 can be tilted slightly towards the flow-on element 68 and thus also towards the actuating member 28. A cardanic attachment of the control body 34 to the actuating member 28 is thus provided. From the radially outer end of the radial extension 76, the flow-on element 68 extends axially to just in front of the bearing edge 56. An end of the flow-on element 68 facing away from the bottom 70 is formed as a collar 77 which extends slightly axially and radially. The radially outer end thereof forms an annular flow-off edge 78 through which a flow is deflected onto a radially inner axial on-flow surface 66 of the flow-on element 68 correspondingly in the direction of the outlet 42, wherein the radially inner axial on-flow surface 66 is formed by the portions of the flow-on element 68 axially facing the inlet 40 and extending substantially radially. More specifically specified, a tangent vector 82 to the annular flow-off edge 78, that is, a tangent to the surface of the collar 77 directed toward the inlet 40 in the radially outer region, points into a region slightly further from the actuator 10 than the bearing edge 56. When the valve is slightly open, this vector thus points into a gap between the valve seat 44 and the bearing edge 56.

In addition to this alignment of the annular flow-off edge 78 with respect to the bearing edge 56 and the associated flow conduit, their arrangement with respect to each other is also important. For example, the annular flow-off edge 78 should be axially offset from the bearing edge 56 only to the extent that a first vector 84, which begins at the annular flow-off edge 78 and is directed radially outwardly toward the bearing edge 56 to a plane 86 spanned by the bearing edge 56, encloses an angle of at most 15°, wherein it is independent in which direction this angle is measured. In the present case, the annular flow-off edge 78 is arranged slightly offset with respect to the actuating member 28 in comparison with the bearing edge 56, wherein an angle of approximately 8° results.

There is furthermore a clear influence due to the arrangement of the wall 54 as well as the openings 64 relative to the bearing edge 56 and to the annular flow-off edge 78. A second vector 88 extending radially outward from any point on the wall 54 toward the bearing edge 56 should thus include an angle of at least 20° relative to the plane 86 spanned by the bearing edge 56. This angle is between 40° and 70° in the exemplary embodiment.

An angle between a third vector 90 extending radially outwardly from one of the openings 64 to the bearing edge 56 to the plane 86 should also be at least 30°. In the present embodiment, this is about 60°. An angle between a fourth vector 92 extending radially outward from the flow-off edge to one of the openings 64 should also be at least 30° to the plane 86. In the present embodiment, this angle is about 66°.

This arrangement of the annular flow-off edge 78, the bearing edge 56, the wall 54, and the openings 64 with respect to each other results in almost no surface of force attack during opening for a decreasing pressure in the gap between the valve seat 44 and the control body 34 due to the flow. The pressure differential that would otherwise occur due to the flow is also reduced by the selective introduction of the flow into the gap.

An interior 94 is also formed in the housing 12 of the overrun-air recirculation valve into which the control body 34 can slide when the valve is actuated. This interior 94 is radially limited by a housing wall 96, to the end of which facing away from the actuator 10 an annular plate 98 is fastened, the inner diameter of which is slightly larger than the outer diameter of the radially outer circumferentially closed outer lateral surface 46. On this annular plate 98 rests a V-shaped seal 100 having two legs, the first of which is in contact against the radially outer circumferentially closed lateral outer surface 46, and the second of which is in contact against the radially limiting housing wall 96, so that in the closed state of the valve, the interior 94 is connected exclusively via the openings 64 to the underlying inlet 40. In order to also supply the central recess 30 between the actuating member 28 and the core 18 with a corresponding pressure and thus create a pressure-balanced valve, one or more grooves are arranged on the outer circumference of the actuating member 28.

A spring 102 is also arranged inside the radially outer circumferentially closed lateral outer surface 46, which is in contact axially against the wall 54, and whose opposite axial end is in contact against the housing 12 of the actuator 10, whereby, when the coil 14 is not energized, the control body 34 is placed in its state resting on the valve seat 44. In this static state, there is a balance of forces so that the spring 102 can be designed to keep the overrun-air recirculation valve in the closed state even when pressure pulsations occur.

For opening, the actuator 10 is energized, wherein only the force of the spring 102 must be exceeded. As soon as a gap is opened between the valve seat 44 and the bearing edge 56, a flow is created through this gap. An influence of the static pressure fluctuations resulting from this is largely avoided since the wall 54 is sufficiently far away from the valve seat 44 and only the thin bearing edge 56 can serve as an force-attack surface for the pressure difference. Pressure equalization can also take place in the interior 94 since no flow acts directly on the openings 64 through the flow conduit via the flow-on element 68, whereby rapid static pressure equalization can take place immediately upon opening which would otherwise be inhibited and thus lead to an additional force acting in the closing direction.

Very fast actuating times can accordingly be achieved with a very small and thus inexpensively producible electromagnet.

It should be clear that the present invention is not limited to the described embodiment. A different actuator may thus also be used, or the outer shell surface and the at least radially extending wall may be manufactured in one piece. Also, if necessary, the flow-on element can be manufactured in one piece with the rest of the control body or have a different design configuration, since the alignment of the flow-off edge in particular is functionally relevant. Also, if necessary, the elastomeric plastic can be dispensed with or used only in the support area. Reference should also be had to the appended claims.

LIST OF REFERENCE NUMERALS

10 Actuator
12 Housing
14 Coil
16 Coil carrier
18 Core
20 Magnetic force return plate
22 Iron jacket
24 Magnetic force return plate
26 Sliding bushing
28 Actuating member
30 Central recess
32 Plug
34 Control body
36 Flow housing
38 Flow channel
40 Inlet
42 Outlet
44 Valve seat
46 Radially outer circumferentially closed lateral outer surface
48 Radially outer cylindrical body
50 Radially outer region
51 Insert
52 Inner hollow body
53 Elastomeric plastic
54 Wall
56 Bearing edge
58 First cylindrical section
60 Radial constriction
62 Second cylindrical section
64 Openings
66 Radially inner axial flow-on surface
68 Flow-on element
70 Bottom
72 Central circular recess
74 Cylindrical section
76 Radial extension
77 Collar
78 Annular flow-off edge
82 Tangent vector
84 First vector
86 Plane
88 Second vector
90 Third vector
92 Fourth vector
94 Interior
96 Housing wall
98 Annular plate 100 V-shaped seal
102 Spring

What is claimed is:
1. An overrun-air recirculation valve comprising:
a flow housing comprising a flow channel between an inlet and an outlet;
a valve seat formed between the inlet and the outlet;
an actuator;
an actuating member which is configured to be translationally movable via the actuator; and
a control body which is fastened to the actuating member, the control body comprising,
a radially outer circumferentially closed lateral outer surface which comprises, at an axial end, a circumferential bearing edge which is configured to be placed onto the valve seat and to be lifted off of the valve seat,
a radially inner axial flow-on surface which is arranged on an axial side facing away from the actuating member, and
a wall comprising,
a first cylindrical section,
a second cylindrical section, and
a radial constriction which is substantially perpendicular to each of the first cylindrical section and to the second cylindrical section,
wherein,
the radial constriction comprises an inner diameter and an outer diameter,
the first cylindrical section extends from the outer diameter of the radial constriction towards a direction of the inlet,
the second cylindrical section extends from the inner diameter of the radial constriction towards the actuating member,
the wall is arranged to extend at least radially inwardly from the radially outer circumferentially closed lateral outer surface, and
the radial constriction of the wall comprises at least one opening via which an interior of the overrun-air recirculation valve is always fluidically connected to the flow channel,
wherein,
a pressure equalization between the interior and the inlet occurs exclusively via the at least one opening, and
the radially inner axial flow-on surface comprises a radially outer annular flow-off edge, the radially outer annular flow-off edge being offset in an axial direction relative to the circumferential bearing edge by a maximum amount so that,
a first vector which extends radially outwardly from the radially outer annular flow-off edge to a nearest point of the circumferential bearing edge to a plane which is spanned by the circumferential bearing edge encloses an angle of at most 15°,
the wall with the at least one opening is offset axially with respect to the circumferential bearing edge and with respect to the radially outer annular flow-off edge in a direction of the actuating member, and
when the control body is moved upwards via the actuating member, the air in the interior is directed through the at least one opening in the wall and between the radially outer circumferentially closed lateral outer surface and the radially outer annular flow-off edge of the radially inner axial flow-on surface.

2. The overrun-air recirculation valve as recited in claim 1, wherein a tangent vector points to a point of the radially outer annular flow-off edge in a region facing away from the actuating member and axially directly adjacent to the circumferential bearing edge.

3. The overrun-air recirculation valve as recited in claim 1, wherein the wall is offset by a distance in a direction of the actuating member so that a second vector in the radial direction outwardly from the wall to the circumferential bearing edge encloses an angle of at least 20° to the plane spanned by the circumferential bearing edge.

4. The overrun-air recirculation valve as recited in claim 1, wherein the at least one opening is offset by a distance in a direction towards the actuating member so that,
a third vector in a radial direction outwards from the at least one opening to the circumferential bearing edge to the plane spanned by the circumferential bearing edge encloses an angle of at least 30°, and
a fourth vector in a radially outward direction from the radially outer annular flow-off edge to the at least one opening to the plane spanned by the circumferential bearing edge encloses an angle of at least 30°.

5. The overrun-air recirculation valve as recited in claim 1, further comprising:
a cylindrical body; and
an inner hollow body comprising a facing region, the inner hollow body being arranged radially outer and axially to the valve seat,
wherein,
the radially outer circumferentially closed lateral outer surface is formed by the cylindrical body and the facing region of the inner hollow body,
the cylindrical body is fixed on the inner hollow body, and
the inner hollow body is motionally coupled to the actuating member and further comprises the wall with the at least one opening and the circumferential bearing edge.

6. The overrun-air recirculation valve as recited in claim 5, wherein,
the wall of the inner hollow body further comprises an insert which is at least partially coated with an elastomeric plastic, and
the inner hollow body is configured to be lowerable onto the valve seat with the elastomeric plastic and to be in contact with the actuating member.

7. The overrun-air recirculation valve as recited in claim 5, further comprising:
a flow-on element comprising a closed bottom facing toward the actuating member and an open axial end facing away from the actuating member,
wherein,
the radially inner axial flow-on surface and the radially outer annular flow-off edge are each formed on the flow-on element.

8. The overrun-air recirculation valve as recited in claim 7, wherein the cylindrical body, the inner hollow body and the flow-on element are each produced as a deep-drawn part from a sheet metal.

9. The overrun-air recirculation valve as recited in claim 7, wherein the flow-on element is fastened via the closed bottom to the actuating member.

10. The overrun-air recirculation valve as recited in claim 7, wherein, the inner hollow body further comprises a radial constriction, the flow-on element further comprises a radial extension, and the radial constriction of the flow-on element is in contact with the radial constriction of the inner hollow body at least in an open state.

11. The overrun-air recirculation valve as recited in claim 7, wherein, the flow-on element further comprises a collar which extends radially outwardly and axially from the open axial end of the flow-on element, and the radially outer annular flow-off edge is formed on the collar.

12. The overrun-air recirculation valve as recited in claim 11, wherein, the collar comprises an axial distance from the actuating member which is greater than an axial distance to the circumferential bearing edge, and the collar extends radially outwardly in a radially outer region and axially in a direction pointing away from the actuating member.

13. The overrun-air recirculation valve as recited in claim 1, wherein, the actuator is an electromagnet, and the actuating member is an armature of the electromagnet.

14. An overrun-air recirculation valve comprising:

a flow housing comprising a flow channel between an inlet and an outlet;

a valve seat formed between the inlet and the outlet;

an actuator;

an actuating member which is configured to be translationally movable via the actuator; and a control body which is fastened to the actuating member, the control body comprising, a radially outer circumferentially closed lateral outer surface which comprises, at an axial end, a circumferential bearing edge which is configured to be placed onto the valve seat and to be lifted off of the valve seat, a radially inner axial flow-on surface which is arranged on an axial side facing away from the actuating member;

a wall which extends at least radially inwardly from the radially outer circumferentially closed lateral outer surface, the wall comprising at least one opening via which an interior of the overrun-air recirculation valve is always fluidically connected to the flow channel; and a flow-on element comprising a closed bottom facing toward and connected with the actuating member and an open axial end facing away from the actuating member, wherein, a pressure equalization between the interior and the inlet occurs exclusively via the at least one opening, the radially inner axial flow-on surface comprises a radially outer annular flow-off edge, the radially inner axial flow-on surface and the radially outer annular flow-off edge are each formed on the flow-on element, and the radially outer annular flow-off edge is offset in an axial direction relative to the circumferential bearing edge by a maximum amount so that, a first vector which extends radially outwardly from the radially outer annular flow-off edge to a nearest point of the circumferential bearing edge to a plane which is spanned by the circumferential bearing edge encloses an angle of at most 15°, the wall with the at least one opening is offset axially with respect to the circumferential bearing edge and with respect to the radially outer annular flow-off edge in a direction of the actuating member, and when the control body is moved upwards via the actuating member, the air in the interior is directed through the at least one opening in the wall and between the radially outer circumferentially closed lateral outer surface and the radially outer annular flow-off edge of the radially inner axial flow-on surface.

15. An overrun-air recirculation valve comprising:

a flow housing comprising a flow channel between an inlet and an outlet;

a valve seat formed between the inlet and the outlet;

an actuator;

an actuating member which is configured to be translationally movable via the actuator; and a control body which is fastened to the actuating member, the control body comprising, a radially outer circumferentially closed lateral outer surface which comprises, at an axial end, a circumferential bearing edge which is configured to be placed onto the valve seat and to be lifted off of the valve seat, a radially inner axial flow-on surface which is arranged on an axial side facing away from the actuating member;

a wall comprising, a first cylindrical section, a second cylindrical section, and a radial constriction which is substantially perpendicular to each of the first cylindrical section and to the second cylindrical section, wherein, the radial constriction comprises an inner diameter and an outer diameter, the first cylindrical section extends from the outer diameter of the radial constriction towards a direction of the inlet, the second cylindrical section extends from the inner diameter of the radial constriction towards the actuating member, the wall is arranged to extend at least radially inwardly from the radially outer circumferentially closed lateral outer surface, and the radial constriction of the wall comprises at least one opening via which an interior of the overrun-air recirculation valve is always fluidically connected to the flow channel; and a flow-on element comprising a closed bottom facing toward and connected with the actuating member and an open axial end facing away from the actuating member, wherein, a pressure equalization between the interior and the inlet occurs exclusively via the at least one opening, the radially inner axial flow-on surface comprises a radially outer annular flow-off edge, the radially inner axial flow-on surface and the radially outer annular flow-off edge are each formed on the flow-on element, and the radially outer annular flow-off edge is offset in an axial direction relative to the circumferential bearing edge by a maximum amount so that, a first vector which extends radially outwardly from the radially outer annular flow-off edge to a nearest point of the circumferential bearing edge to a plane which is spanned by the circumferential bearing edge encloses an angle of at most 15°,
the wall with the at least one opening is offset axially with respect to the circumferential bearing edge and with respect to the radially outer annular flow-off edge in a direction of the actuating member, and
when the control body is moved upwards via the actuating member, the air in the interior is directed through the at least one opening in the wall and between the radially outer circumferentially closed lateral outer surface and the radially outer annular flow-off edge of the radially inner axial flow-on surface.

* * * * *